Aug. 14, 1945.  E. H. REISS  2,382,817
PROTECTIVE MEANS FOR AIRCRAFT
Filed Aug. 24, 1943   2 Sheets-Sheet 1
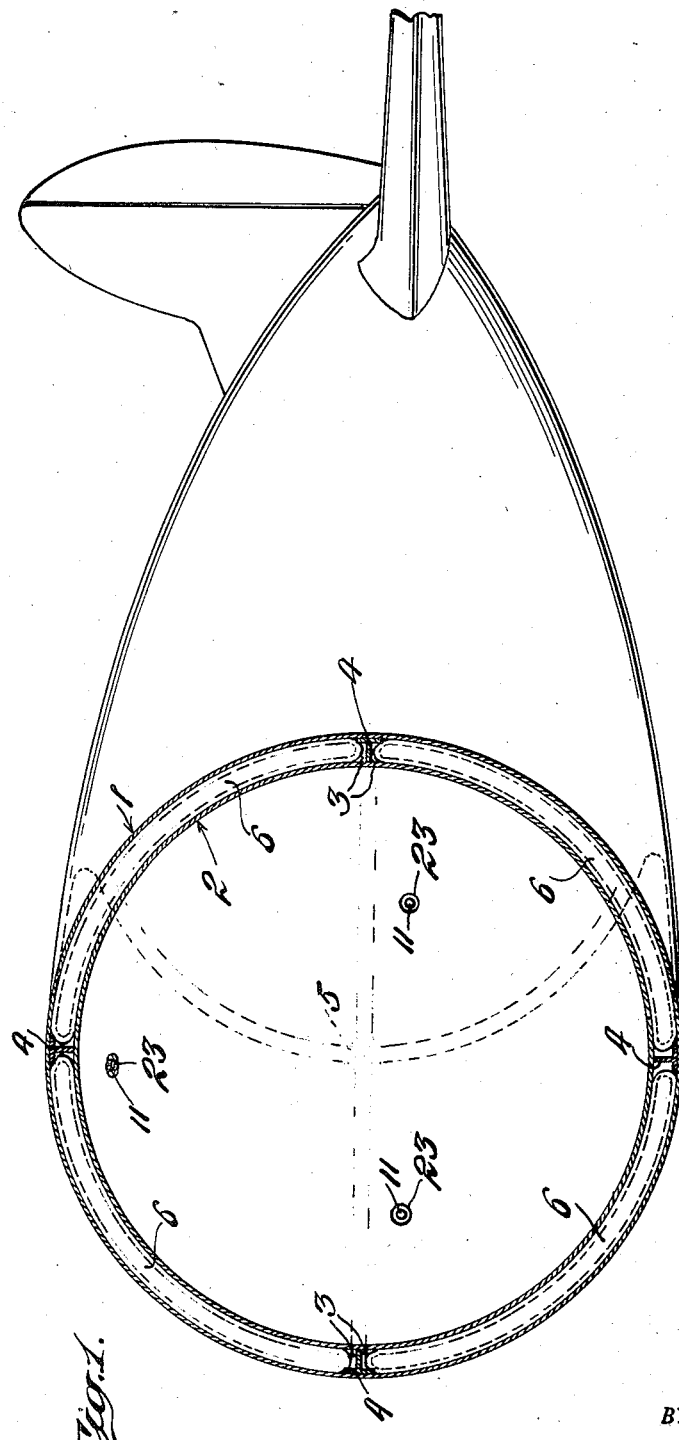
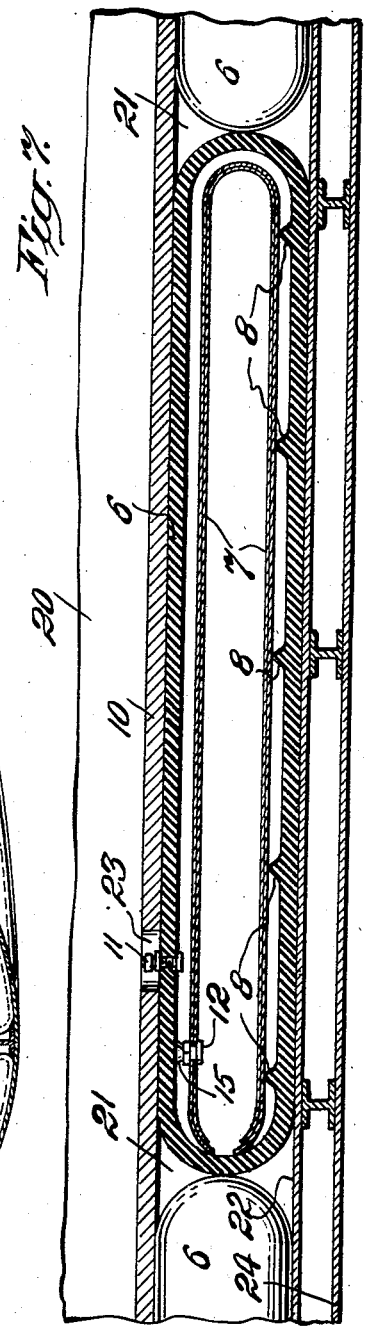
INVENTOR.
ERNEST H. REISS
BY
ATTORNEY Aug. 14, 1945.　　　　E. H. REISS　　　　2,382,817
PROTECTIVE MEANS FOR AIRCRAFT
Filed Aug. 24, 1943　　　2 Sheets-Sheet 2
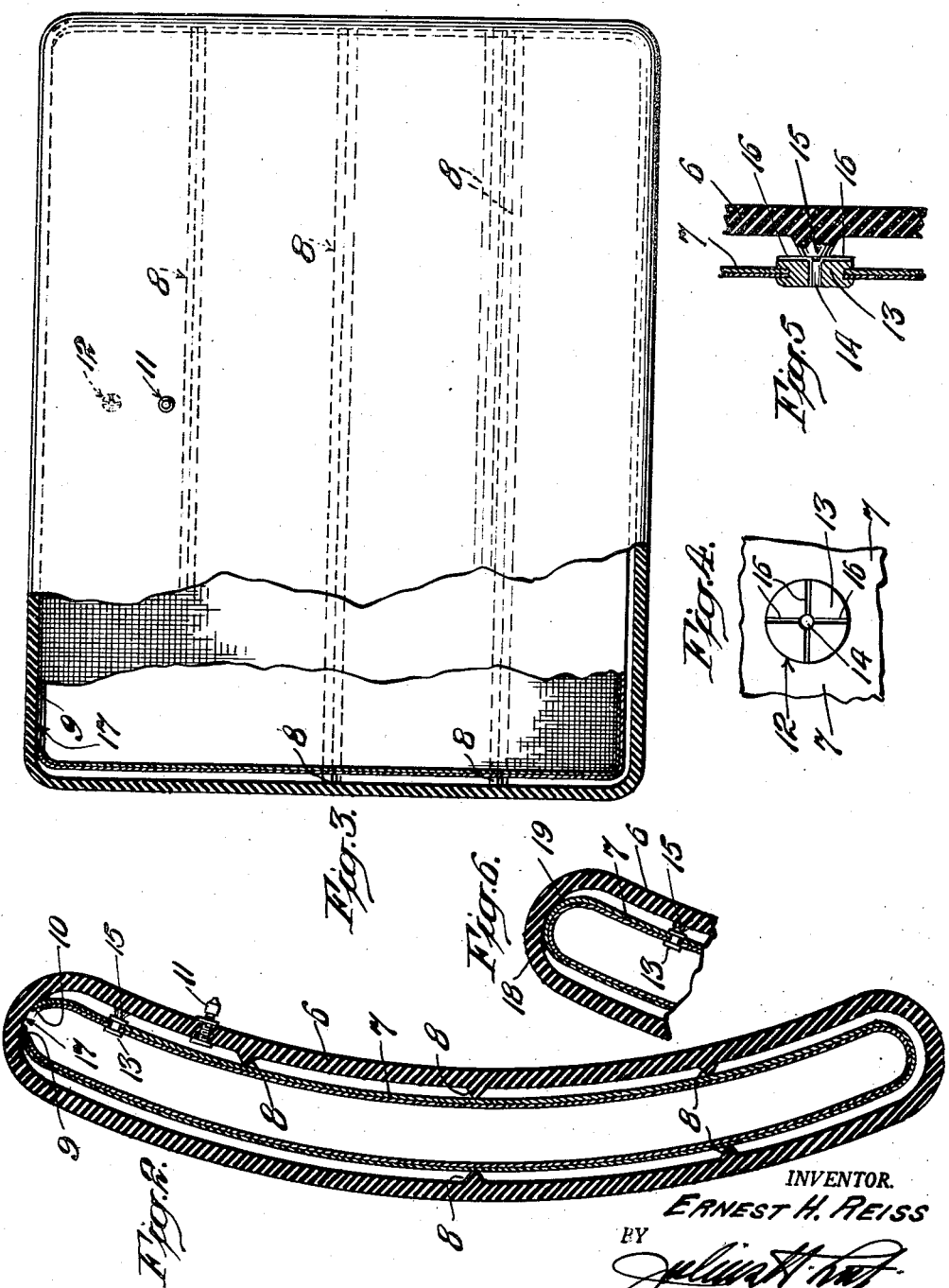
INVENTOR.
ERNEST H. REISS
ATTORNEY Patented Aug. 14, 1945

2,382,817

UNITED STATES PATENT OFFICE 2,382,817

PROTECTIVE MEANS FOR AIRCRAFT

Ernest H. Reiss, Floral Park, N. Y.

Application August 24, 1943, Serial No. 499,804

3 Claims. (Cl. 244—5)

This invention relates to protective means for aircraft, boats or other craft, and has for its object the provision of a buoyant protective cushioning means by which the penetrating effect of bullets, missiles, shrapnel and the like will be resisted. The invention further contemplates the provision of means by which the fuselage, wings and other aircraft parts may have their buoyancy materially increased by the provision of gas-filled bags or "lungs" embracing or extending through such areas of the craft as may be found necessary or desirable.

The invention also contemplates the employment of a plurality of bags or "lungs" of puncture-resistant of self-sealing construction, and preferably filled with a lighter-than-air, non-explosive gas such as helium gas, with such bags preferably disposed between inner and outer skins of the fuselage or other aircraft parts. The arrangement of these gas-filled bags is such that they not only serve to provide bullet-resistant protection for the areas of the craft in which they are located, but they also provide buoyancy and flotation characteristics of a highly desirable nature.

More particularly, the invention consists in the provision of gas-inflated bags, as above set forth, disposed in the selected parts of the aircraft, and preferably in such a location as to not occupy normally usable space, so that such bags do not encroach upon space used for carrying men, equipment or supplies.

While I have herein set forth the advantages of the described construction as applied to aircraft, it will be understood that such construction is equally applicable to boats and other craft. Therefore, in herein referring to "aircraft" I wish to be understood as meaning any other craft to which the improved structure may be applied with satisfactory results.

In the accompanying drawings, forming a part hereof, Fig. 1 is a sectional view through an aircraft body or fuselage, showing the gas-filled bags in place according to the invention; Fig. 2 is a transverse sectional view through one of the bags; Fig. 3 is a face view of one of the bags, with parts thereof broken away, and other parts shown in section to disclosed construction; Fig. 4 is a face view of one of the valves in the inner bag; Fig. 5 is a sectional view through said valve, and Fig. 6 is a sectional view through a portion of one of the bags, showing a modified construction. Fig. 7 is a sectional view through portion of a dirigible balloon or other similar craft, showing the disposition of the inflated bags below the catwalk.

With reference to the structure of Fig. 1, wherein the invention is shown as applied to the body or fuselage of an airplane. Therein, 1 indicates the outer covering or so-called "skin" of the body, and 2 indicates an inner lining or inner skin, the latter being spaced from the outer skin so that compartments 3, separated from one another by the longitudinally extending frame members 4, are provided. Transverse frame members, extending circumferentially of the body, are located at spaced intervals, or at the points 5, and co-operate with the longitudinal members 4 in the formation of the compartments 3 in which the air bags are located.

Situated in each of the compartments 3 is one of the inflated bags, the constructional details of which are shown in Figs. 2 to 5 inclusive. Each bag is composed of an outer casing 6 containing an inner bag 7, the latter being for convenience referred to as the "inner tube." The outer casing is preferably made of puncture resistant material such as that which is employed in puncture-proof tires and self-sealing gasoline tanks, and the inner tube may be made of double or multiple thicknesses or plies of impregnated canvas or other suitable tough airtight and leakproof material. The bags are made in such shape and size as to snugly fit within the compartments 3 or in any other space intended for their reception.

On its inner surface, the outer casing 6 is formed with a plurality of spaced, longitudinally extending ribs 8 which serve to hold the inner tube spaced from the inside of the outer casing, as clearly indicated in Fig. 2. The inner tube is secured to the inside of the outer casing by having its longitudinally extending ends 9 and 10 vulcanized or otherwise securely united to the inside of the outer casing, thereby maintaining the inner tube in an established position within the casing. This arrangement is such as to make flexing of the bag easily done to conform it to the shapes of the compartments or other locations in which it is fitted. A tire valve 11 is provided in the outer casing so that the gas with which the bag is inflated can be delivered into the interior of the outer casing. The valves 11 of the several bags employed in the various compartments 3, are exposed through apertures 23 in the inner skin of the fuselage so that said valves are easily accessible for inflating the bags with the gas.

The gas, delivered into the the interior of the outer casing 6 of each bag, will pass through a seepage valve 12 to reach the interior of the inner tube 7 so that the inner tube, as well as the outer casing will be inflated with the gas under pressure and the pressure uniformly distributed throughout the bag. The use of helium gas or other lighter-than-air, non-explosive gas is suggested.

The seepage valve 12 is shown in detail in Figs. 4 and 5, wherein it will be seen that the same includes a disk 13 having a central passage 14 extending through it and normally closed by the conical head 15 located on the inside of the outer casing. Slits 16 extend radially from the opening 14. The construction of this valve is suggestive, as any suitable valve of similar nature may be used.

In operation, the several spaced, gas-inflated bags or lungs will be located in such parts of the craft as may be found necessary or desirable, and particularly where protection for members of the crew is to be secured. Since the bags or lungs are puncture-proof and bullet-resistant, the bags not only materially protect the crew, but due to their buoyancy they provide a great measure of protection and safety should the craft be forced to land on the water. The employment of lighter-than-air gas in the bags adds great buoyancy to the ship; it enables a quicker take-off and permits the carrying of greater loads. In case of landing at sea, the craft will not only float indefinitely but can be used as a life-raft to pick up survivors.

In case of penetration of the outer casing of a bag by a bullet, the spacing between said casing and the inner tube will in many cases, prevent penetration of the inner tube, the bullet falling down in the space between the outer casing and the inner tube.

In Fig. 6 of the drawings is shown a modification of the bag structure, wherein the inner bag, instead of being split as indicated at 17 in Fig. 2, may be continuous and be vulcanized to the inner face of the outer casing as at the points 18 and 19.

While I have shown the improved structure as being particularly applicable to airplanes, it may well be applied to other aircraft, such as dirigible balloons. For example, in Fig. 7 I have shown the cat-walk of a dirigible balloon at 20, with one or more compartments 21 located below the same and between the cat-walk and the outer coverings 22 and 24. In these compartments a plurality of the gas-inflated bags or lungs, constructed as heretofore described will be located, thereby not only protecting the crew of the craft, but for materially aiding in adding buoyancy, both in the air and in the water, to the craft.

This and various other embodiments may be made without departing from the spirit of the invention.

What I claim is:

1. In an aircraft, an outer covering, an inner lining spaced therefrom, a gas-filled bag disposed between the lining and outer covering, said bag including an outer casing, an inner tube within the casing, and spacing means consisting of projections formed on the inside of the outer casing for holding the inner tube spaced from the inside of the outer casing.

2. In an aircraft or the like, a fuselage having an outer skin, an inner lining within the skin and spaced therefrom, means dividing said space between the skin and lining into a plurality of separate compartments, a gas-inflated bag located in each of said compartments whereby the fuselage is surrounded by said bags, each of the bags having an outer puncture-resistant casing and an inflated inner tube, the inner tube being spaced from the casing but secured to the inside of the casing at least at one point therein, the inner surface of the outer casing being provided with a plurality of longitudinally extending ribs for maintaining the inner tube spaced from the inside of the casing.

3. In an aircraft or the like, an outer covering, an inner lining spaced therefrom, a gas-filled bag located between the lining and outer covering, said bag comprising an outer puncture-resistant casing, a filler valve leading thereinto, an inner tube within the casing and secured to one end of the same, means on the inside of the casing for holding the inner tube spaced from the inside of said casing, and a seepage valve establishing communication between the interior of the inner tube and the inside of the outer casing.

ERNEST H. REISS.